(12) United States Patent
Byrne et al.

(10) Patent No.: US 9,729,690 B2
(45) Date of Patent: Aug. 8, 2017

(54) DYNAMIC INTERACTIVE VOICE INTERFACE

(75) Inventors: William J. Byrne, Sunnyvale, CA (US); Henry W. Gardella, San Jose, CA (US); Jeffrey A. Gilmore, Half Moon Bay, CA (US)

(73) Assignee: Ben Franklin Patent Holding LLC, Los Altos, CA (US)

( * ) Notice: Subject to any disclaimer, the term of this patent is extended or adjusted under 35 U.S.C. 154(b) by 337 days.

(21) Appl. No.: 13/079,530

(22) Filed: Apr. 4, 2011

(65) Prior Publication Data

US 2011/0246203 A1    Oct. 6, 2011

Related U.S. Application Data

(63) Continuation of application No. 09/934,121, filed on Aug. 21, 2001, now Pat. No. 7,920,682.

(51) Int. Cl.
*H04M 1/64* (2006.01)

(52) U.S. Cl.
CPC .................................. *H04M 1/645* (2013.01)

(58) Field of Classification Search
CPC ...................................................... H04M 3/493
USPC ...................................................... 379/88.18
See application file for complete search history.

(56) References Cited

U.S. PATENT DOCUMENTS

| | | | |
|---|---|---|---|
| 4,531,184 A | 7/1985 | Wigan et al. | |
| 4,964,077 A * | 10/1990 | Eisen et al. | 715/707 |
| 5,029,085 A * | 7/1991 | Ito | 704/9 |
| 5,189,702 A | 2/1993 | Sakurai et al. | |
| 5,367,454 A | 11/1994 | Kawamoto et al. | |
| 5,493,608 A | 2/1996 | O'Sullivan et al. | |
| 5,500,920 A | 3/1996 | Kupiec | |
| 5,559,927 A | 9/1996 | Clynes | |
| 5,636,325 A | 6/1997 | Farrett | |
| 5,652,789 A | 7/1997 | Miner et al. | |
| 5,682,469 A | 10/1997 | Linnett et al. | |
| 5,751,793 A | 5/1998 | Davies et al. | |
| 5,761,662 A * | 6/1998 | Dasan | |
| 5,768,508 A | 6/1998 | Eikeland | |
| 5,774,628 A | 6/1998 | Hemphill | |

(Continued)

FOREIGN PATENT DOCUMENTS

| EP | 0 697 780 A2 | 2/1996 |
|---|---|---|
| EP | 1 102 241 A1 | 5/2001 |

(Continued)

OTHER PUBLICATIONS

Baekgaard, Anders, et al., "Tools for Designing Dialogues in Speech Understanding Interfaces," Proceedings of the International Conference on Spoken Language Processing (ICSLP), pp. 1249-1252, Japan (Nov. 1990).

(Continued)

*Primary Examiner* — Amal Zenati
(74) *Attorney, Agent, or Firm* — Sterne, Kessler, Goldstein & Fox PLLC

(57) ABSTRACT

A dynamic voice user interface system is provided. The dynamic voice user interface system interacts with a user at a first level of formality. The voice user interface system then monitors history of user interaction and adjusts the voice user interface to interact with the user with a second level of formality based on the history of user interaction.

30 Claims, 5 Drawing Sheets

(56) References Cited

U.S. PATENT DOCUMENTS

| | | | |
|---|---|---|---|
| 5,802,526 A * | 9/1998 | Fawcett | G06F 3/167 348/14.06 |
| 5,805,784 A | 9/1998 | Crawford | |
| 5,860,064 A | 1/1999 | Henton | |
| 5,873,057 A | 2/1999 | Eves et al. | |
| 5,896,530 A | 4/1999 | White | |
| 5,911,043 A | 6/1999 | Duffy et al. | |
| 5,949,854 A | 9/1999 | Sato | |
| 5,953,392 A | 9/1999 | Rhie et al. | |
| 5,987,415 A | 11/1999 | Breese et al. | |
| 6,061,433 A | 5/2000 | Polcyn et al. | |
| 6,064,874 A | 5/2000 | Cox et al. | |
| 6,108,420 A | 8/2000 | Larose et al. | |
| 6,112,177 A | 8/2000 | Cosatto et al. | |
| 6,144,938 A | 11/2000 | Surace et al. | |
| 6,182,116 B1 | 1/2001 | Namma et al. | |
| 6,195,641 B1 | 2/2001 | Loring et al. | |
| 6,226,656 B1 | 5/2001 | Zawadzki et al. | |
| 6,301,339 B1 | 10/2001 | Staples et al. | |
| 6,334,103 B1 | 12/2001 | Surace et al. | |
| 6,339,423 B1 * | 1/2002 | Sampson et al. | 715/854 |
| 6,349,290 B1 | 2/2002 | Horowitz et al. | |
| 6,366,882 B1 | 4/2002 | Bijl et al. | |
| 6,418,440 B1 | 7/2002 | Kuo et al. | |
| 6,424,793 B1 | 7/2002 | Setogawa et al. | |
| 6,442,519 B1 * | 8/2002 | Kanevsky | G10L 15/07 704/243 |
| 6,487,277 B2 * | 11/2002 | Beyda | H04M 3/493 379/72 |
| 6,490,343 B2 | 12/2002 | Smith et al. | |
| 6,526,382 B1 * | 2/2003 | Yuschik | G10L 15/1822 704/257 |
| 6,539,359 B1 | 3/2003 | Ladd et al. | |
| 6,647,257 B2 | 11/2003 | Owensby | |
| 6,745,193 B1 | 6/2004 | Horvitz et al. | |
| 6,885,736 B2 | 4/2005 | Uppaluru | |
| 2002/0010584 A1 | 1/2002 | Schultz et al. | |
| 2002/0069243 A1 | 6/2002 | Raverdy et al. | |
| 2002/0174363 A1 | 11/2002 | Chefalas et al. | |
| 2003/0005062 A1 | 1/2003 | Hachiya et al. | |
| 2005/0091056 A1 | 4/2005 | Surace et al. | |

FOREIGN PATENT DOCUMENTS

| | | |
|---|---|---|
| JP | 2002041834 A | 2/2002 |
| WO | WO/96/11542 A | 4/1996 |
| WO | WO/99/65215 | 12/1999 |
| WO | WO/97/33416 A | 9/2007 |

OTHER PUBLICATIONS

Chin, John P., Personality Trait Attributions to Voice Mall User Interfaces: Proceedings of the 1996 Conference on Human Factors in Computing Systems, CHI 96, Online!, XP002113878, pp. 248-249, Canada (Apr. 1996).

International Search Report for Appln. No. PCT/US02/26921, issued Dec. 10, 2002, 4 pages.

Supplemental European Search Report for Appl. No. EP 02775723, issued Sep. 26, 2005, 2 pages.

European Search Report issued in European Patent Application No. 02 775 723.6 on Nov. 26, 2008, 7 pages.

James, F., "AHA: Audio HTML Access," printed from http://www-pcd.stanford.edu/-fjames/aha/www6/PAPER296.html.

James, F., "Presenting HTML Structure in Audio: User Satisfaction with Audio Hypertext," printed from http://www-pcd.edu/-fjames/reports/pilot-tr/techrep-pilot.html on Apr. 14, 1997.

Karttunen, L., and Peters, S., "Conventional Implications of Montague Grammar," Berkeley Linguistic Society, 1, pp. 266-278 United States (1975).

"Method for Approriately Interfacing to User Characteristics in a Voice Interface System," IBM Technical Disclosure Bulletin, vol. 37, No. 3, pp. 307-308 United States (Mar. 1994).

Nass, C., and Lee, K. M., In press, "Does computer-generated speech manifest personality? An experimental test of similarity-attraction and consistency," *Journal of Experimental Psychology: Applied* 7(3) pp. 171-181, United States (2001).

Nass, C. et al., "Are Respondents Polite to Computers? Social Desirability and Direct Responses to Computers," *Journal of Applied Social Psychology*, 29(5) pp. 1093-1110, United States (1999).

Reeves, B. and Nass, C., *The Media Equation: How People Treat Computers, Television, and New Media Like Real People and Places*, ISBN No. 1-57586-052-X, CSLI Publications, pp. 89-108, United States (1996).

Stalnaker, R. C., "Assertion," in P. Cole (ed.) *Syntax and Semantics, vol. 9, Pragmatics*, pp. 315-332, United States (1978).

Trainor et al., "The Inclusion of Personality Trait Based Adaptive Interfaces Into Computing Based Learning and Training Environments," *Abstract and Proceedings of the Thirty-First International Matador Conference*, pp. 195-200, United Kingdom (Apr. 1995).

\* cited by examiner

DYNAMIC INTERACTIVE VOICE INTERFACE

CROSS-REFERENCE TO RELATED APPLICATIONS

The present application is a continuation of U.S. patent application Ser. No. 09/934,121, filed Aug. 21, 2001, entitled "Dynamic Interactive Voice Interface," which is incorporated herein by reference in its entirety.

COPYRIGHT & TRADEMARK NOTICE

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and shall not be construed as descriptive or limit the scope of this invention to material associated only with such marks.

BACKGROUND

Field of Invention

The present invention relates generally to interactive interfaces and, more particularly, to a dynamic interactive voice interface.

Related Art

Voice communication devices, such as telephones, traditionally have been used for mere voice communications or for accessing information using touch-tone dialing. With advancements in communications technology, today various types of information can be accessed using voice recognition systems that translate spoken utterances into system commands for data retrieval. Voice recognition systems, typically, include interactive voice interfaces.

An interactive voice interface (also referred to as voice user interface or VUI) is a type of interface that is voice driven. Using particular voice commands, a person can interact with the voice interface in order to browse the content of a web site or access information stored in a database, for example. A VUI provides the communication means between a user and a voice recognition system. A voice recognition system recognizes a user utterance or user request and attempts to service the request.

Many VUIs are implemented to provide the user with certain prompts or interactive voice menus to assist the user to communicate with the voice recognition system. In interacting with the users, many of the current VUIs are rigid, monotonous, repetitive, and basically inhuman. Inasmuch as spoken discourse is a dynamic process, the current VUIs fail to capture the essence of natural conversation. Developing personified, natural language VUIs is an art and a science in itself.

Studies have shown that user interaction with technology is fundamentally social. Thus, social rules should desirably be applied to computer voices. Designers of current VUIs have not fully addressed the social issues revolving human-computer interaction. Therefore, the current VUIs lack the artistic touches that go along with voice acting, voice directing, and audio engineering—factors that should be all considered while developing and implementing a VUI. For example, the current VUIs do not have a well-defined human personality that can interact with a user in a natural conversational style and adapt to the user needs and environment.

Furthermore, spoken discourse is a collaborative process that changes as the conversation unfolds based on the shared knowledge of the participants. Unfortunately, current VUIs are not implemented to remember past interactions with the user and accordingly modify their behavior as expected in natural spoken language. For example, typically the conversational style between two people becomes less formal as the two people become more intimate during the conversation. But the current VUIs fail to adapt their conversational style in a natural way. For example, a VUI continues to repeat the same prompts over and over again, regardless of the number of times a particular user has interacted with the system. This can be impersonal, unhelpful, and irritating.

People interact more positively with a person who communicates so as not to offend other people. This behavior is also expected on a conscious and subconscious level with voices associated with computer applications. Marketing research has shown that providing more user-friendly interactive systems provides greater buying intentions and higher quality reviews. Thus, a voice user interface system is desirable that can incorporate human personality and provide intelligent responses that can assist a user to access needed information. Further, it is desirable for a VUI to develop a more human conversational style and to adapt to changes in a user's speech and experience over time.

The following references provide more detailed information on the topic of human computer interactions and computer generated speech:
1. H. H. Clark, Arenas of language use (1992).
2. L. Karttunen & S. Peters, "Conventional Implications of Montague Grammar," Berkeley Linguistic Society, 1, 266-278 (1975).
3. D. K. Lewis; Convention: A Philosophical Study (1969).
4. C. Nass & K. M. Lee, In press, "Does computer-generated speech manifest personality? An experimental test of similarity-attraction and consistency," Journal of Experimental Psychology: Applied.
5. C. Nass et al., "Are Respondents Polite to Computers? Social Desirability and Direct Responses to Computers," Journal of Applied Social Psychology, 29(5), 1093-1110 (1999).
6. B. Reeves & C. Nass, The Media Equation (1996).
7. S. Schiffer, Meaning (1972).
8. R. C. Stalnaker, Assertion. In P. Cole (ed.) Syntax and Semantics, vol. 9. Pragmatics, 315-332 (1978).

SUMMARY

One aspect of the invention is directed to a voice interface system and corresponding methods that dynamically adapt to interact with a user in a natural conversational style. Embodiments of the system are designed to provide access to voice-mail as well as other information, such as updates on stock quotes, news, weather, and sports scores.

In some embodiments, the voice interface system is designed to establish and maintain a relationship between a user and a consistent voice personality in order to provide a friendly and natural conversational ambiance. For example, in some embodiments the user and the VUI interact or converse in a less formal manner as the user history of interaction with the system grows.

The system in certain embodiments is implemented to provide a user with information without the need for the user to initiate a request. In this manner, the system becomes less of a distraction for the user in multitasking environments that require more of the user's attention, such as in-vehicle environments.

Certain embodiments minimize extra or unnatural steps for accessing specialty or frequently used information. Accessing information in a complex data structure can become cumbersome for the user under stressful circumstances. For example, instead of taking two steps to access a list of stock quotes, in embodiments of the system, the user can get the desired information by issuing a single command, or no command at all.

Since human discourse changes both during conversations and between conversations, embodiments of the system are user-specific and can adapt to a user's needs. In other words, the system can be trained to develop a personality and structure that serves an individual user better by tracking and monitoring the user's behavior during each interaction. In addition, in certain embodiments, the user can train the system by setting up a user profile to customize the system.

In accordance with one aspect of the invention, a method of providing voice user interface comprises: providing a voice user interface that interacts with a user in a first level of formality; monitoring a history of user interaction with the voice user interface; and adjusting the voice user interface to interact with the user in a second level of formality based on the history of user interaction.

In accordance with another aspect of the invention, a method of providing voice user interface services comprises providing a user with a first option to visit one of a plurality of domains by uttering a voice command associated with one of the plurality of domains. The domains are contained in an ordered data structure. Each domain comprises respective content available for presentation to the user. A first one of the plurality of domains is visited automatically, if no response is provided by the user for the first option. Then the user is provided with a second option to hear content of the first domain. The content of the first domain is played, if no response is provided by the user to the second option. In some embodiments, said one or more domains are visited in an order defined in accordance with user preference information recorded in a user profile.

Some embodiments of the system further comprise one or more virtual hosts for interacting with a user while the user traverses the ordered data structure to access the content stored therein. The user has the option of selecting one or more virtual hosts. Further, the system is implemented such that said one or more virtual hosts each has a defined personality based on the information stored in the user profile. The user may update the user profile information to modify the personalities of said one or more virtual hosts.

In accordance with yet another aspect of the invention, a voice user interface system for providing a user with access to content includes an ordered data structure having one or more domains. Each domain is associated with content belonging to one or more content categories. A grammar is provided for traversing the ordered data structure to access the content. The grammar comprises vocabulary having one or more terms associated with said one or more domains, and rules for visiting said one or more domains and for playing content therein. The rules correspond to said one or more terms.

The system also comprises a user profile having a user preference log for storing information about a user's preferences for accessing content in said one or more domains. A user interaction history log stores information about the user's history of interaction with the system. A command provided by the user at a recognition instance is processed against the terms included in the vocabulary for recognition. If a match is found, then one or more domains in the ordered data structure are visited or content belonging to said one or more domains is played in accordance with the rule associated with the command.

DETAILED DESCRIPTION

Information management systems and corresponding methods, according to one or more embodiments of the invention, facilitate and provide electronic services for interactive voice systems that dynamically adapt to interact with a user in a natural conversational style.

The terms "electronic services" and "services" are used interchangeably through out this description. An online service provider provides the services of the system, in one or more embodiments. A service provider is an entity that operates and maintains the computing systems and environment, such as server system and architectures, which process and deliver information. Typically, server architecture includes the infrastructure (e.g., hardware, software, and communication lines) that offers the electronic or online services.

Figure 1A:
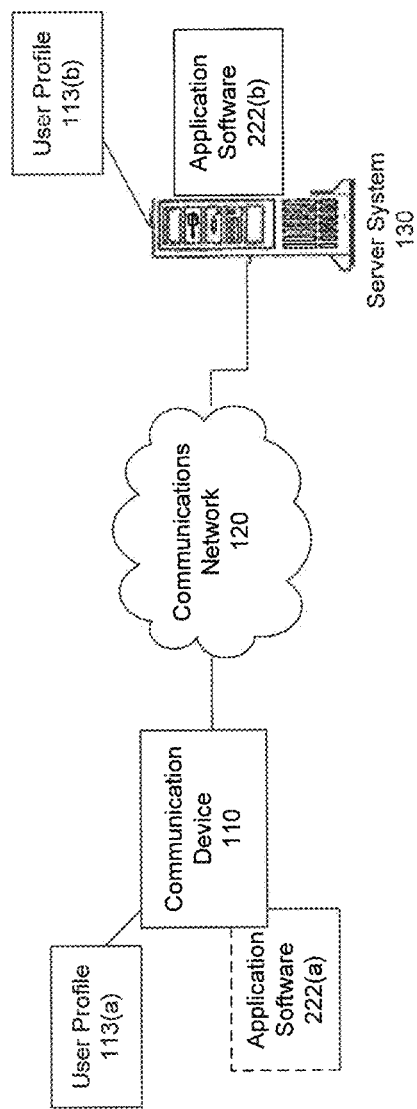
FIG. 1A is a diagram illustrating an environment in which a system of the present invention may operate, in accordance with one embodiment.

These services provided by the service provider may include telephony and voice services, including plain old telephone service (POTS), digital services, cellular service, wireless service, pager service, voice recognition, and voice user interface. To support the delivery of services, service provider may maintain a system for communicating over a suitable communication network, such as, for example, a communications network 120 (FIG. 1A). Such communications network allows communication via a telecommunications line, such as an analog telephone line, a digital T1 line, a digital T3 line, or an OC3 telephony feed, a cellular or wireless signal, or any other suitable media.

In the following, certain embodiments, aspects, advantages, and novel features of the system and corresponding, methods have been provided. It is to be understood that not all such advantages may be achieved in accordance with any one particular embodiment. Thus, the invention may be embodied or carried out in a manner that achieves or optimizes one advantage or group of advantages as taught herein without necessarily achieving other advantages as may be taught or suggested herein.

Nomenclature

The detailed description that follows is presented largely in terms of processes and symbolic representations of operations performed by conventional computers, including computer components. A computer may comprise one or more processors or controllers (i.e., microprocessors or microcontrollers), input, and output devices, and memory for storing logic code. The computer may be also equipped with a network communication device suitable for communicating with one or more networks.

The execution of logic code (i.e., computer program) by the processor causes the computer to operate in a specific and predefined manner. The logic code may be implemented as one or more modules in the form of software or hardware components and executed by a processor to perform certain tasks. Thus, a module may comprise, by way of example, of software components, processes, functions, subroutines, procedures, data, and the like.

The logic code conventionally includes instructions and data stored in data structures resident in one or more memory storage devices. Such data structures impose a physical organization upon the collection of data bits stored within computer memory. The instructions and data are programmed as a sequence of computer-executable codes in the form of electrical, magnetic, or optical signals capable of being stored, transferred, or otherwise manipulated by a processor.

It should also be understood that the programs, modules, processes, methods, and the like, described herein are but an exemplary implementation and are not related, or limited, to any particular computer, apparatus, or computer programming language. Rather, various types of general purpose computing machines or devices may be used with logic code implemented in accordance with the teachings provided, herein.

System Architecture

Referring now to the drawings, FIG. 1A illustrates an exemplary environment in which the invention according to one embodiment may operate. In accordance with one aspect, the environment comprises at least a server system 130 connected to a communications network 120. The terms "connected," "coupled," or any variant thereof, mean any connection or coupling, either direct or indirect, between two or more elements. The coupling or connection between the elements can be physical, logical, or a combination thereof.

Communications network 120 may include a public switched telephone network (PSTN) and/or a private system (e.g., cellular system) implemented with a number of switches, wire lines, fiber-optic cables, land-based transmission towers, and/or space-based satellite transponders. In one embodiment, communications network 120 may include any other suitable communication system, such as a specialized mobile radio (SMR) system.

As such, communications network 120 may support a variety of communications, including, but not limited to, local telephony, toll (i.e., long distance), and wireless (e.g., analog cellular system, digital cellular system, Personal Communication System (PCS), Cellular Digital Packet Data (CDPD), ARDIS, RAM Mobile Data, Metricom Ricochet, paging, and Enhanced Specialized Mobile Radio (ESMR)).

Communications network 120 may utilize various calling protocols (e.g., Inband, Integrated Services Digital Network (ISDN) and Signaling System No. 7 (SS7) call protocols) and other suitable protocols (e.g., Enhanced Throughput Cellular (ETC), Enhanced Cellular Control (EC2), MNP10, MNP10-EC, Throughput Accelerator (TXCEL), and Mobile Data Link Protocol). Transmission links between system components may be analog or digital. Transmission may also include one or more infrared links (e.g., IRDA).

Communications network 120 may be connected to another network such as the Internet, in a well-known manner. The Internet connects millions of computers around the world through standard common addressing systems and communications protocols (e.g., Transmission Control Protocol/Internet Protocol (TCP/IP), HyperText Transport Protocol (HTTP)), creating a vast communications network.

One of ordinary skill in the art will appreciate that communications network 120 may advantageously be comprised of one or a combination of other types of networks without detracting from the scope of the invention. Communications network 120 can include, for example, Local Area Networks (LANs), Wide Area Networks (WANs), a private network, a public network, a value-added network; interactive television networks, wireless data transmission networks, two-way cable networks, satellite networks, interactive kiosk networks, and/or any other suitable communications network.

Communications network 120, in one or more embodiments, connects communication device 110 to server system 130. Communication device 110 may be any voice-based communication system that can be used to interact with server system 130. Communication device 110 can be, for example, a wired telephone, a wireless telephone, a smart phone, or a wireless personal digital assistant (PDA). Communication device 110 supports communication by a respective user, for example, in the form of speech, voice, or other audible manner capable of exchanging information through communications network 120. Communication device 110 may also support dual tone multi-frequency (DTMF) signals.

Server system 130 may be associated with one or more content providers. Each content provider can be an entity that operates or maintains a service through which audible content can be delivered. Content can be any data or information that is audibly presentable to users. Thus, content can include written text (from which speech can be generated), music, voice, and the like, or any combination thereof. Content can be stored in digital form, such as, for example, a text file, an audio file, etc.

In one or more embodiments of the system; application software 222 is implemented to execute fully or partially on server system 130 to provide voice recognition and voice interface services. In some embodiments, application software 222 may comprise a set of modules 222(a) and 222(b) that can operate in cooperation with one another, while executing on separate computing systems. For example module 222(a) may execute on communication device 110 and module 222(b) may execute on server system 130, if application software 222 is implemented to operate in a client-server architecture.

As used herein, the term server computer is to be viewed as designations of one or more computing systems that include server software for servicing requests submitted by devices or other computing systems connected to communications network 120. Server system 130 may operate as a gateway that acts as a separate system to provide voice services. Content may be stored on other devices connected to communications network 120. In other embodiments, server system 130 may provide the voice interface services as well as content requested by a user. Thus, server system 130 may also function to provide content. The terms server or server software are not to be limiting in any manner.

In some embodiments, a user profile 113 may be stored as user profile 113(a) and 113(b), so that it is partially stored on both communication device 110 and server system 130. A separate user profile 113 may be provided for each user of the system. User profile 113 can be a collection of information that specifies for each user the user's preferences, history of interaction with the system, and other relevant information unique to the user.

In accordance with embodiments of the present invention, the user profile 113 can be used to implement a voice user interface (VUI, which dynamically changes in order to emulate a natural conversational style. From the user's perspective, the VUI may seem to become more familiar with the user over time, either in a single interactive session or throughout a series of interactive sessions. For example, the VUI can "speak" in a more formal manner with the user, at first. During subsequent interactions, the VUI records in user profile 113 a history of user interaction with the system. As the user interaction history grows or develops, the VUI may start to speak in a more informal manner, which simulates a degree of familiarity and intimacy with the user. This provides an enhanced experience for the user.

Application Software for Providing Voice User Interface

Figure 1B:
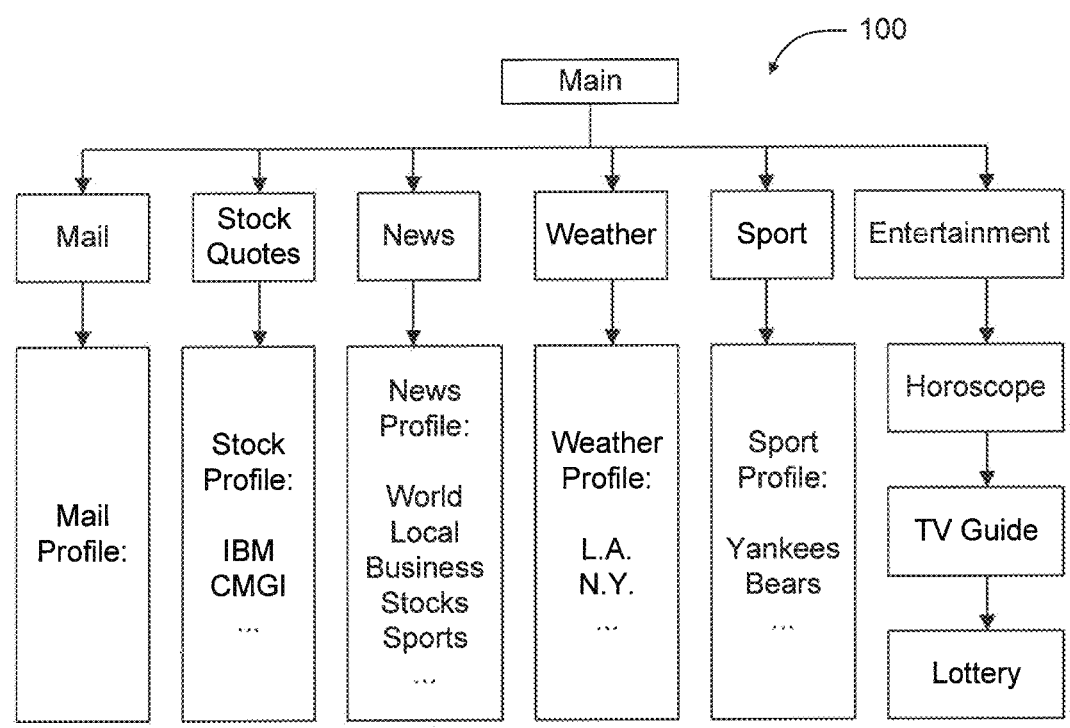
FIG. 1B is an exemplary illustration of an ordered data structure containing a plurality of content domains, in accordance with one aspect of the invention.
Figure 2:
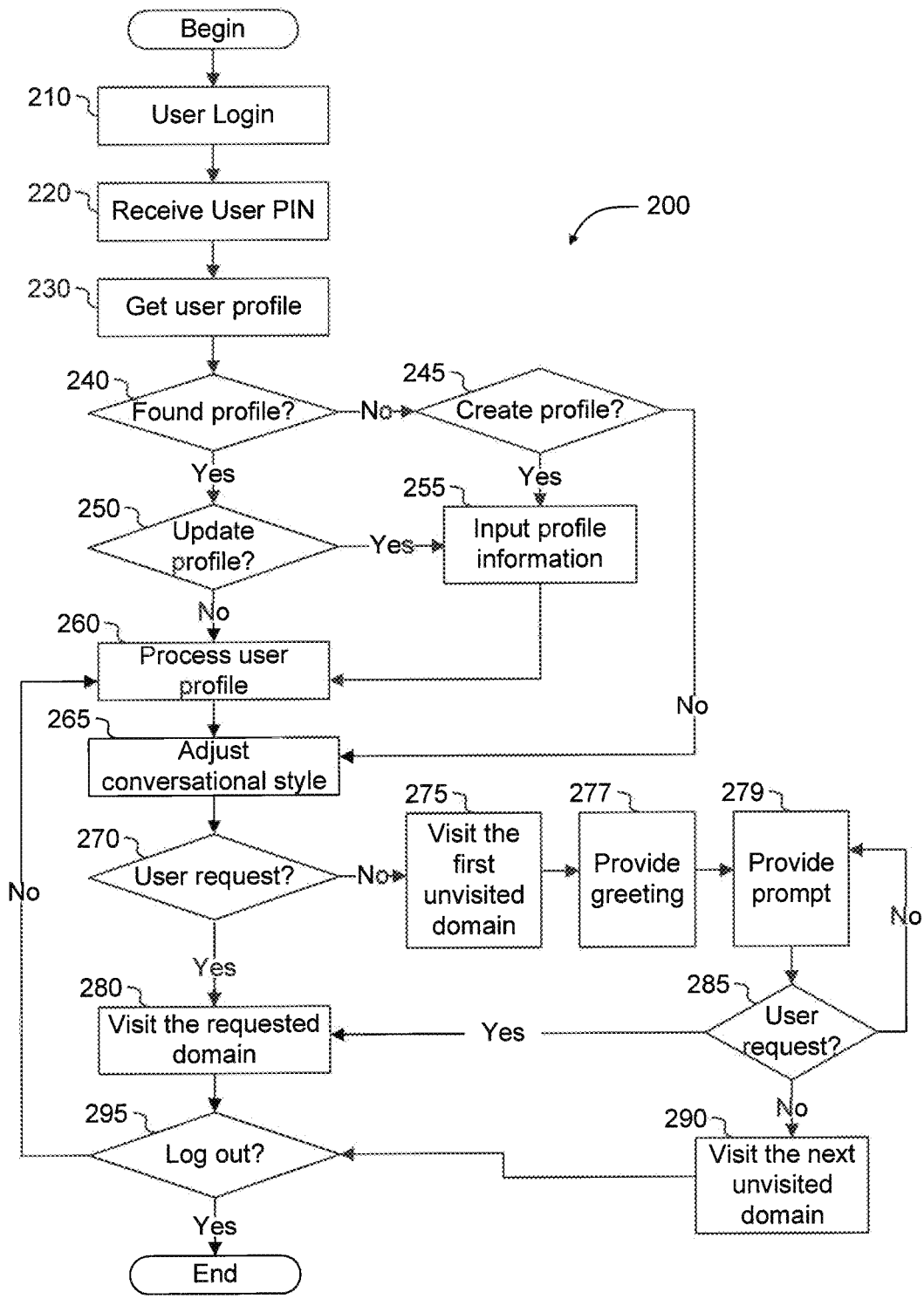
FIG. 2 is a method of providing voice user interface services, in accordance with one or more embodiments of the system.

Referring to FIGS. 1 and 2, application software 222, in accordance with one aspect of the invention, is executed on server system 130 to provide a voice user interface (VUI) between a user using communication device 110 and a content provider attached to network 120. Providing a VUI involves a method 200 for receiving, processing, and responding to voice requests submitted via communication device 110 in a series of exemplary steps illustrated in FIG. 2.

A user, typically, uses communication device 110 to access content available from a content provider, which can operate server system 130, for example. According to one or more embodiments, a user at step 210 logs into the system. At the login stage, the VUI prompts the user to provide a user personal identification number (PIN). The PIN can be a four-digit number or combination of letters and numbers, for example. At step 220, the system receives the user PIN, repeats it for verification and attempts to authenticate it against confidential records stored on the system.

If the login is successful, the system greets the user by his or her name for example. In one embodiment, if authentication fails, the system allows the user to try again (e.g., three tries) to enter a valid PIN. An exemplary VUI login session is provided below:

VUI: Welcome. Please tell me your personal identification number.
User: 1234
VUI: 1234, is that correct?
User: Yes.
VUI: Good Afternoon John.

Once the user has successfully logged in, the system attempts to locate the user's profile 113, at step 230. At step 240, if the system does not find user profile 113, then at step 245 the system determines whether a user profile needs to be created. If, for example, it is the user's first interactive session, then no profile for the user may be available. Thus, at step 255, the VUI may provide the user with the option and opportunity to input profile information into the system. In one or more embodiments, profile information is received by the system by way of user interaction with the VUI, or a graphic user interface (GUI) available on a web site, or other interactive interface.

The user can interact with such interface to create the profile, or alternatively if the profile already exists, to update the profile. At step 250, the user can select to update his or her profile. Once the profile is updated or created, then at step 260 the system processes the profile information and incorporates it into the system for the user preferences to take effect. After processing the user profile at step 260, in accordance with one aspect of the invention, the system periodically monitors and analyzes the content of the user profile, specifically user interaction history 330. Based on the information stored in user profile 113, the system at step 265 adjusts the conversational style in accordance with the natural rules of social discourse. The VUI waits for a user request at step 270.

Based on user interaction history 330 the system can distinguish a novice user from an expert user. Thus, conversational style, menus, and other interface features are automatically adjusted based on the user's experience level, so that the user would have the impression of interacting with a human rather than a machine. For example, a conversational style may become less formal as discourse continues in a single session, or as a user interaction history develops during the course of multiple sessions. Other possible adjustments to the conversational style are possible and will be discussed in further detail below.

One or more embodiments include a feature that allows users to access content in the available domains in accordance with their preset profiles without having to interact as much with the system during a session. So at step 275, the system automatically visits the first unvisited domain or category in the ordered data structure, if no user request is received at step 270. Once a domain, sub-domain, or category is visited, the system plays or otherwise presents the corresponding content, unless interrupted or otherwise directed by the user.

In some embodiments, the VUI may provide the user with a greeting and/or a prompt, respectively at steps 277 and 279, prior to playing the content. If a user request is received, at step 285, the system grants the request, if possible, by visiting the requested content domain, at step 280. If no user request is received, the system then moves on to visit the next unvisited domain in the ordered data structure, at step 290, in accordance with the user profile. At step 295, the system determines if the user has requested to log out. If so, method 200 terminates. Otherwise, the system returns to step 260 to further process user profile, for example.

VUI Domains:

The system, in accordance with one embodiment, has one or more primary content domains, and possibly sub-domains, defined by an ordered data structure, for example. A commonly used ordered data structure 100 for storing data in an organized manner is illustrated in FIG. 1B. This structure includes a main menu for access to one or more primary domains or sub-domains thereof. A content domain represents a group of information that is accessible by the user through the VUI. Information in each domain can be related to a common topic or subject. Exemplary domains may include Mail, Stock Quotes, Weather, News, Sports Scores, and Entertainment. In some embodiments, the News domain has sub-domains for World, Local, and Business, for example, and the Entertainment domain has, for example, the following sub-domains: Horoscopes, TV Guide, and Lottery Results.

In accordance with one aspect of the invention, the sub-domains for each domain may be implemented using various data structures. In some embodiments, the sub-domains may be in the form of a profile list including a list of information categories under the associated domain. The News domain, for example, includes profile lists for the sub-domains of World, Local, Business, etc. In other embodiments, the sub-domains may be implemented separately from and linked to the associated domain: For example, sub-domains of Horoscope, TV Guide, and Lottery are provided apart from the associated domain of Entertainment domain.

To access the data in each domain or sub-domain, the user interacts with the system using specific voice commands. Each of these domains may have one or more sub-domains. In order to access the content of each sub-domain a user may be required to move through the associated domain first. For example, in the exemplary embodiment illustrated in FIG. 1B, if the user is in the News domain, the user may readily move to the business sub-domain to listen to business related news. However, if the user is visiting the Entertainment domain, the user may have to visit the "Horoscope" and the "TV Guide" sub-domains before accessing the "Lottery" domain for information relating to lotteries. Data structures other than data structure 100 may also be utilized for organizing content in an accessible manner.

VUI Grammar:

User requests (i.e., voice commands) need to meet certain requirements. For example, a request should be recognizable by the VUI before it can be acted on by the system. To be recognized, at least part of the request or command needs to be included in a vocabulary for a grammar of the system. The vocabulary may comprise a set of terms or phrases, for example. In a voice recognition system for implementing at least a part of the VUI, a separate acoustic model may be provided for each term or phrase of the vocabulary. Once the user provides a command, the system determines whether that command is part of the vocabulary. That is, the system attempts to recognize the command. If the command is recognized, the system may take some predefined action in response to the recognized command, such as, for example, visiting a particular domain.

Voice recognition accuracy suffers as the number of terms in the grammar's vocabulary increases, because the system needs to process a larger vocabulary. Also, chances of improper recognition increase, if the vocabulary includes multiple acoustically similar terms that have distinct meanings. Therefore, it is more efficient and accurate for the system to be implemented so that only a limited number of terms are processed and recognized at each instance. We refer to these instances as recognition instances, throughout this document.

As provided in further detail below, in some embodiments, a particular group of commands are recognizable by the VUI at all times (i.e., globally), regardless of the domain visited. This group of commands can be referred to as a "global vocabulary" in that these commands are available by default at all recognition instances. Other commands, however, even if included in system's vocabulary, are recognizable only when the user is visiting a certain domain. This limitation in recognition improves both system efficiency and accuracy.

Exemplary commands that may be globally recognizable, in accordance with one or more embodiments include: "Next," "Previous," "First," "Last," or equivalents thereof (e.g., "forward," "back," "get the first One," "get the last one," "go to"). Using such commands, a user can direct the system to visit domains in the immediate vicinity of the currently visited domain, for example. The following is an exemplary dialogue between a user and the VUI, while the user is accessing information available in the Mail domain. In the exemplary dialogues provided herein, "TTS" indicates a portion of the dialogue wherein the system may use text-to-speech software/hardware to "vocalize" written text.

VUI: You have three new messages and you have old messages. Here's the first one.

Message from: (TTS) Bill Byrne, Subject: (TTS) hello . . . Say PLAY IT to hear the rest of the message.

User: Get the next one.

VUI: Next one. Message from: (TTS) Sam Jones, Subject: (TTS) meeting.

User: Get the last one.

VUI: Last one. Message from: (TTS) Sally Smith, Subject: (TTS) lunch.

User: Get the previous one.

VUI: I'll go back one, Message from: (TTS) Sam Jones, Subject: (TTS) meeting.

User: Get the first one.

VUI: Here's the first one. Message from: (TTS) Bill Byrne, Subject: (TTS) hello.

In some embodiments, the VUI will go on to the next item automatically if the user remains silent, as provided in the following example:

User: Get the next one.

VUI: Next one. Message from: (TTS) Sam Jones, Subject: (TTS) meeting.

User: (Silence)

VUI: Here is the next one: (TTS) Hi Bill . . . (end of header).

In the following, other exemplary terms and commands that may be included in the system's global vocabulary are provided. It should be noted that the following terms or commands are provided by way of example. Alternative vocabulary or synonyms for these commands can be used, if desired.

"Pause," "Stop," "Take a Break"

Users may need to discontinue interacting with the VUI in order to attend to other matters, for example, to talk to someone else, or simply to pay attention to something urgent. By using the "pause" command, the user can prevent the system from processing user dialogue for recognition for a certain timeout period (e.g., for up to three minutes) or indefinitely, depending on implementation or user customization. To continue interacting with the system prior to the expiration of the timeout period, the user may have to reactivate the system by issuing a reactivation command, such as, "come back," "continue," "return," or equivalents thereof. Once the system is reactivated, it provides the user with a message providing information about the previous recognition instance, and or the last domain visited, for example. The following is an exemplary demonstration of how the dialogue may transpire:

User: Take a break.

VUI: Sure. Say "come back" when you need me.

User: (talks to a friend in the passenger seat—VUI does not respond).

User: Come back.

VUI: You were at the Mail domain before. Continue with playing message from Bill Byrne?

"Goodbye"

In accordance with one aspect of the system, users may choose to end a VUI session by saying "Goodbye," or other termination command, for example. Because the system may interpret an acoustically similar utterance as a termination command, to lower frustration levels in such circumstance, the system waits for a timeout period (e.g., three seconds) before terminating the session. During the timeout period, the user has a chance to reinstate the session. The session may be reinstated if the VUI detects the user uttering a specific command, or anything, for example. An exemplary termination dialogue is provided below:

User: Get my sports scores.

VUI: OK. Talk to you later.

User: No! Wait!
VUI: Would you like to go back to where we left off?
User: Yes!
VUI: OK. We were at the Mail domain before . . .
"Help"

In one or more embodiments, invoking the "Help" command will deliver the appropriate response based on the location of the user in the dialog. Other phrases or terms equivalent to the term "Help" may be utilized. For example, a user may say, "What are my choices?" or "Choices" to get the VUI to provide him or her with a list of domains or sub-domains available for visiting at the particular instance. An exemplary dialogue that may ensue while the user is visiting the News or the Sports domain is provided below:

(Visiting in the News domain)
User: What are my choices?
VUI: You can say Headline News, Business News, National News, World News, Sports News, or Stock Market Update . . .
(Visiting in the Sports domain)
User: What are my choices?
VUI: To move through the list in your profile say Get the first one, Get the next one, Get the previous one, Get the last one. Otherwise tell me the sports category you'd like me to look up. For college sports say College Football, etc. . . .

It is noteworthy to point out that the grammar in various domains may be implemented differently. For example, as provided in the above examples, in the News domain, the grammar may include vocabulary associated with the titles of the domains or sub-domains, while in the Sports domain, the grammar may comprise the global vocabulary.

This change in interaction styles or modes between the domains, not only provides for better recognition accuracy and efficiency, but also delineates between the domains by providing a different interactive experience. The grammar vocabulary and rapes may be expanded or limited in other manners to provide a user with a comfortable and smooth interactive experience, as provided herein.

"Go back"

In accordance with one or more embodiments of the, system, the "Go back" command causes the system to return to a previous domain, such as the previously visited domain. An exemplary dialogue using this command is provided below:
VUI: Let's check your email . . .
User: Go back.
VUI: I'll go back to your Sports Scores.
"Move on"

In accordance with one or more embodiments of the system, the "Move on" command causes the system to visit the next unvisited domain in the ordered data structure, or the next domain in the order specified in user profile 113. In some embodiments, if there are no more unvisited domains, the VUI will prompt the user to make a choice. An exemplary dialogue is provided below:
User: Move on.
VUI: Moving to Stock Quotes . . .
Or
User: Move on.
VUI: There are no more new domains to visit. To move on say "Get my email," "Get my stock quotes," . . . "Forget it," "Cancel"

In accordance with one or more embodiments of the system, the "Forget it" or the "Cancel" command causes the system to move to a neutral domain in the dialogue and ask the user for the next action to be taken. For example, in one embodiment, if there are unvisited domains, the VUI will give the user a chance to say something and then simply move on to the next specified domain. An exemplary dialogue is provided below:
VUI: Here's the next mail item . . .
User: Forget it.
VUI: No problem. Let me know what you'd like me to do next. Otherwise I'll just move on.
"Customer care"

In accordance with one or more embodiments of the system, the "Customer care" command telephonically connects the user to the service provider's customer care facilities. In some embodiments, to limit an improper recognition of this command, the VUI prompts the user to confirm the selection, as provided below:
User: Get me customer care.
VUI: Connecting to customer care. Is that right?
User: Yes.
VUI: OK. Dialing.

Figure 3A:
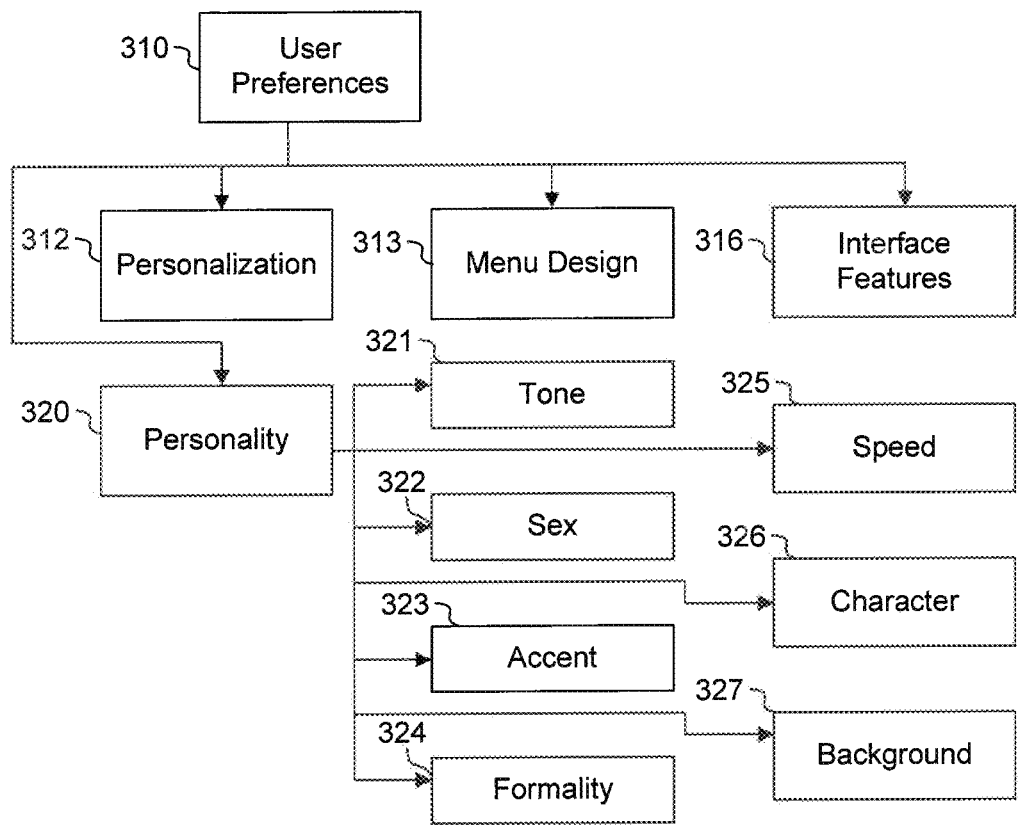
FIGS. 3A and 3B are block diagrams illustrating exemplary information that can be stored in a user profile, in accordance with one embodiment.
Figure 3B:
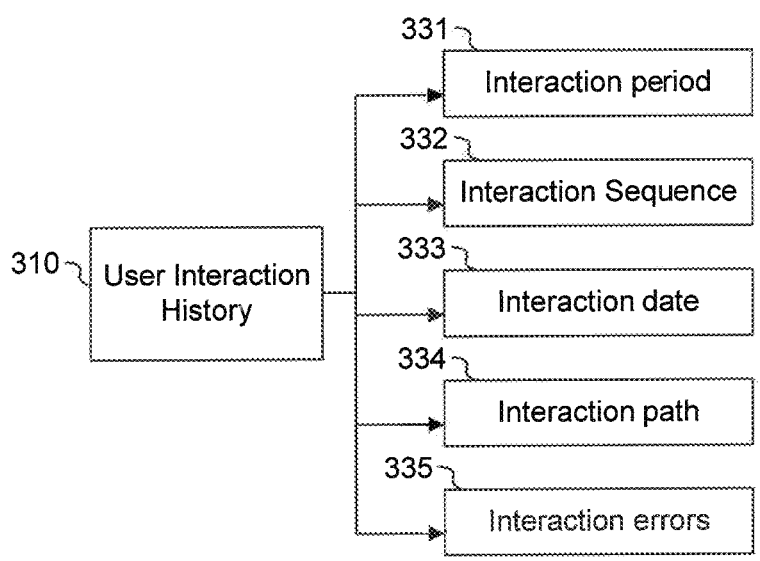

User Profile:

A user profile 113, in accordance with one embodiment, is a collection of information that includes the user's preferences, interaction history, and other relevant information that is unique to each user. FIGS. 3A and 3B illustrate exemplary information that can be a part of the user profile, in accordance with an embodiment. Such information may include, but is not limited to, user preference 310 and user interaction history 330. As depicted, user preferences 310 can include information for personalization 312, menu design 313, interface history features 316, and personality 320. User interaction history 330 can include information for interaction period 331, interaction sequence 332, interaction date 333, interaction path 334, and interaction errors 335. User preferences 310 and user interaction history 330 are described in more detail herein. Customized profiles for each individual user can be stored on server system 130, communication device 110, or other systems connected to communications network 120.

User Preferences

User preferences 310 may include one or more of the following categories of information, depending on implementation or user preference, for example:

Personalization

Referring to FIG. 3A, a user may have certain interface preferences 310. For example, in certain embodiments, the VUI may be customized based on personalization information 312 to traverse the ordered data structure 100 in a unique path as defined by each user (FIG. 1B). That is, a user can customize his or her profile to define the content domains, sub-domains, and/or categories that the user prefers to visit, the order in which the user prefers to visit the various content. Personalization information 312 may also define a user's favorite domains, sub-domains, or categories that the user prefers to access immediately without having to go through the hierarchy in ordered data structure 100. For example, referring to FIG. 1B, a user may customize his or her profile to include the domains Mail, News, and Entertainment so that the VUI would play the content included in the above domains in the following order: News, Mail, Entertainment.

In some embodiments, the user may customize the personalization information 312 such that content included in certain sub-domains is accessible from the main menu. For example, referring to the exemplary ordered data structure 100, a user may want to be able to access lottery information from the main menu or any other domain or sub-domain without traversing through the ordered data structure's 100 hierarchy. Thus, the user may set up his or her respective profile so that the global vocabulary would include the terms associated with the lottery sub-domain. In this manner, the VUI will recognize a user request for accessing lottery information at any recognition instance.

In some embodiments, the system records information about the content requested or sub-domains accessed most frequently by a specific user. Once a threshold is reached, or a condition is met, for example, then the system automatically adds the terms associated with a corresponding domain to the global vocabulary. As such, the system automatically expands its grammar to recognize various requests for the most-frequently accessed content.

Menu Design

In embodiments of the system, the VUI includes menus that adjust based on familiarity of the user with the system. For example, in one embodiment, the user can provide menu design information 313 to customize system menus to his or her preference. For example, the user may have the choice of selecting between extended or shortened menus. An extended menu provides a user with most or all the available options at each recognition instance. A shortened menu provides the user with a subset of the available options, unless the user requests otherwise. In some embodiments, the length of prompts for each menu option is adjusted, as well. This technique helps to reduce occasional frustration associated with listening to lengthy menus or instructions that a more experienced user may have no interest in.

In one embodiment, if the user has customized the user profile for the shortened menu option, the menu setting may be switched to extended menu option if the user provides a specific command, such as, "Switch to extended menu." The difference between the options provided in an extended menu versus a shortened menu depends on implementation and may vary based on user preference. Provided below are exemplary prompts provided at the main level, when a user first logs in:

(Extended Menu)
VUI: Good morning John. Please select from the following domains: Menu, Stock Quotes, News, Weather, Sports, Entertainment . . . "
User: Get my Stock Quotes.
(Shortened Menu)
VUI: Hi John. Which domain do you want to visit?
User: Stock Quotes.

In certain embodiments, the system is implemented to include a barge-in feature. This feature allows the user to interrupt the system before the entire prompt has been played. That is, if the VUI, while playing a prompt, detects a user utterance, then the VUI attempts to recognized the utterance and service the request immediately. This feature, also helps to reduce user frustration associated with using automated systems.

In one or more embodiments, the system automatically adjusts menu length based on the nature and extent of user interaction with the system. As a user continues to interact with the system, the user learns more about the availability of the domains, the paths leading to a certain domain, and the various commands available for accessing different types of contents. For a novice user, however, traversing the system may be a bit of a challenge until the user becomes familiar with the system's intricacies. Thus, in some embodiments, the system monitors and records a user's interaction history 330 with the system, as illustrated in FIG. 3B, and uses that information to adapt the system menu to the needs of the user.

Interface Features

In accordance with one aspect of the invention, first-time users will hear a brief (e.g., two or three minute) tutorial that will outline the overall structure of the VUI domains, menus, and major features. In addition, the tutorial defines various commands and directs users to an affiliate web site, for example, for further information and assistance. Since the tutorial instruction may be too long or too detailed for retention, the system provides the users with the chance to review or replay the tutorial during subsequent sessions by, for example, saying "Play the tutorial."

The style of natural discourse, typically, changes as the parties get to know one another better. Thus, in one embodiment of the system, the VUI will adjust its behavior according to the rules of natural discourse. For example, when a first-time user interacts with the VUI, the VUI may address the user in a more formal or polite manner, provide him with more assistance by offering extended menus, and play a first voice prompt that is recorded such that the speaker speaks in a slow pace. In contrast, in subsequent interactions, the VUI may provide a more casual dialogue, limit any extraneous interaction instructions, and play a second voice prompt such that the speaker speaks in a faster pace, for example. The following dialogues demonstrate how a first-time user may experience a different interactive session in comparison with a long-term user:

(First-time user)
User: Get my Sports Scores.
VUI: Moving to Sports Scores. For a list of available categories, say "What are my choices?" There are five sports categories in your sports profile. Here's the first one. <VUI plays audio feed> . . .
(Long-term user)
User: Get my Sports Scores.
VUI: Moving to Sports Scores. Which Category?
User: Major League Baseball.
VUI: OK. <VUI plays audio feed for Major League Baseball>.

In one or more embodiments, if the user remains quiet, the VUI will read through the user profile to determine the user's preference at that point, if available. The VUI will then attempt to visit the appropriate domains, sub-domains, and deliver content automatically rather than waiting for user instructions. For example, in one embodiment, the default behavior for the VUI is to move on to domains unvisited by the user. In some embodiments, the system moves on: (1) after the user has heard the last item in a category, or (2) after the user has timed out by failing to respond to a VUI prompt. The following dialogues provide an illustration of VUI interaction with a user in an exemplary embodiment:

User: Get my Sports Scores.
VUI: Moving to Sports Scores. You've listed one category. Here it is <VUI plays audio feed>.
VUI: That was the only item in your sports profile.
User: (Silence)
VUI: Let's move on to Business News (next unvisited category specified in the User profile).
Or
User: Get my Sports Scores.
VUI: Moving to Sports Scores. Tell me the sports category you'd like me to look up.
User: Look up Professional Basketball.
VUI: <VUI plays feed for that category>
User: (Silence)
VUI: Let me know what you'd like me to do. Otherwise, I'll just move on.

User: (Silence)

VUI: Let's move on to Entertainment (next unvisited category in the ordered data structure.

In some embodiments, if the VUI has gone through all categories listed in the user profile, the VUI then prompts the user to make a choice, as provided below, for example:

VUI: That was the last category listed in your profile. Let me know what you'd like me to do. If you need help say, "What are my choices."

In summary, the VUI processes information included in the user profile and waits for a user request. One or more embodiments include a feature that allows users to access content without having to interact with the system during a session. The system visits the first unvisited domain or category in accordance with the personalization information 312, for example. The system monitors the visited domains, sub-domains, and categories by, for example, tagging each one after they have been visited.

Once a domain, sub-domain, or category is visited, the system plays the corresponding content, unless otherwise interrupted or directed by the user. In some embodiments, the VUI may provide the user with a greeting and/or a prompt, prior to playing the content. If a user request is received, the system grants the request, if possible, by visiting the requested content domain. If no user request is received, the system then moves on to visit the next unvisited domain in the ordered data structure in accordance with the user profile.

Interface Personality

In consideration of the fact that personality is a significant aspect of spoken discourse, embodiments of the system are implemented so that a user can select one or more virtual hosts with different personalities. Referring to FIG. 3A, a user is able to indicate in his or her profile specific character traits such as tone 321, sex 322, accent 323, formality 324, speed 325, character 326, and background 327 to develop a personality for the VUI host.

The result of the personality development process is a back-story or mini-biography of the host with whom the user will interact. In some embodiments, the back-story is thorough enough to capture specific traits. For example, the back-story would provide how formal, humorous, helpful, eager, or businesslike the host may act. With this information available, the system maintains consistency throughout the VUI levels and makes decisions about prompt wording and the structure and frequency of help prompts, for example. While a user has the choice of selecting from different virtual hosts, once a virtual host is selected the user will be interacting with the selected host who will maintain a consistent personality, unless otherwise changed by the user.

In one embodiment, the system may allow the user to select from a number of different personalities. A first personality, Mary for example is helpful, articulate, confident, and takes initiative. A second personality, Jim for example is authoritative, formal, self assured, and serious. A third personality, Tom for example is young, friendly, and casual. Other characters and personalities may be developed based on the personality information 320 provided in the user profile.

User Interaction History

Referring to FIG. 3B, the interaction history 330 may comprise the following information: interaction period 331, interaction sequence 332, interaction date 333, interaction path 334, and interaction errors 335. Interaction period 331 denotes, for example, the length of interaction during each interactive session. Interaction sequence 332 denotes, for example, the frequency with which the user accesses the system over a period of time. The system uses this information to determine the user's experience level in interacting with the system.

Using the above factors, the system can automatically adjust the system configuration or even user preferences 310 to better suit the user's needs. For example, if the interaction period 331 or interaction sequence 332 indicate that the user has a long history of interaction with the VUI, then the system adjusts the VUI prompts to include conversational styles that are less formal, or the system adjusts the VUI's menus from extended mode to shortened mode.

In one embodiment, the system monitors user interaction with the VUI over time, for example, during the course of a single session, or during the course of multiple interactive sessions. This information is recorded in user profile 113 and is periodically updated as user interaction with the VUI continues. The system determines the user interaction level based on information recorded in user profile 113 as user interaction history develops. In some embodiments, for example, interaction period 331 or interaction sequence 332 are associated with values that are incremented based on the amount of time a user spends interacting with the VUI, or the number of times the user has interacted with the VUI, over a certain time span.

The system evaluates the user interaction level with the VUI based on the above values and accordingly adjusts system settings. For example, the VUI may address the user by his last name if user interaction level has not reached a certain threshold (e.g., the user has interacted with the system in less than three sessions, or under three minutes). Once the threshold is met, the system may then address the user by his first name, for example, or otherwise adjust the VUI prompts and menus so that from the User's perspective a more casual interaction ambiance is provided.

In some embodiments, the system may ask for the user's permission before adjusting the conversational style to a more casual level, for example, to avoid the possibility of offending the user. Further, a user may actively set the conversational style and various interactive features by manually adjusting the values and information recorded in the user profile. As provided earlier, in one or more embodiments, a user may interact with the VUI, or a graphic user interface (GUI), for example, to initially create a user profile 113, or alternatively if the profile already exists, to update the information included in user profile 113. Once the profile is updated or created, the system processes the profile information and configures the system accordingly for the user preferences to take effect.

It is noteworthy that the information recorded as part of user interaction history 330 may be utilized to adjust system features other than those provided herein. Further, other system features may be adjusted based on information gathered and recorded during each interactive session. Thus, the examples provided here are by way of example and therefore are not to be construed as limiting the scope of the invention.

Interaction date 333 denotes, for example, the date and time of user interaction with the system. Interaction path 334 denotes, for example, a history of visited domains within the ordered data structure. Interaction errors 335 comprise, for example, a list of the user's most common interaction errors or all such errors. The above information is used by the system to adjust system features so that a user can more comfortably and efficiently access the available content.

For example, the system may use the interaction date to determine if a user has not interacted with the system in a long period. If so, the system may greet the user by indicating how nice it is to hear from him again, or advise the user of any newly implemented features since the user's last session. If the user has had a long history of interaction with the VUI, the system may provide the user with extended menus to refresh the memory of the user and then switch back to the shortened menu mode again, once a threshold is reached.

Information recorded as part of interaction path 334 and interaction errors 335 are useful in implementing the system's grammar so that the user is better understood and directed towards the appropriate content included in various domains of ordered data structure 100. For example, certain most frequently visited domains, sub-domains, or categories may be added to a globally accessible grammar, so that the content of such domains or sub-domains is immediately accessible, or automatically provided to the user, as soon as the user logs in.

For example, if the recorded interaction history indicates that the user checks information related to the weather conditions for San Francisco every time the user logs in, then the system may adjust the grammar so that the user would not have to visit the Weather domain first in order to get San Francisco weather. Alternatively, the VUI may ask the user at the beginning of each session the following question:

VUI: Good morning John, would you like to know what the weather is like in San Francisco today?
User: Yes.

Or, the system may provide the information voluntarily, if the interaction history indicates that the first content the user accesses at each session is the weather information for San Francisco. An exemplary system prompt in such situation is provided below:

VUI: Good morning John, the weather forecast for San Francisco is sunny, humid, . . . What can I get for you, today?

Interaction errors 335 are recorded in user profile 113 to monitor the types of errors that occur during user interaction with the system. For example, if the system detects that in many recognition instances no input is provided, that may indicate that the VUI is too sensitive and detects extraneous noise in the user's environment as input. In such situation, the system may automatically adjust the VUI sensitivity level so that any detected sound with a level that is less than a predetermined threshold is discarded and not processed as input meant for recognition.

Also, in accordance with one aspect of the system, if a certain acoustic model is repeatedly not recognized by the VUI, then the system may process the repeated acoustic model to determine the nature of the user utterance. If the system determines that the utterance is improperly rejected, for example because the system lacks a sufficient variety of acoustic models, then the system adds the new acoustic model to the grammar's vocabulary. As such, the system can be customized for each individual user so that user-specific commands are recognized by the VUI and performed by the system.

For example, consider the following exemplary dialogue between a user and the VUI, in accordance with one embodiment:

VUI: You have 3 new mail messages.
User: Read the first one.
VUI: I'm sorry, I didn't understand that. To read your first message say get me the first mail message.
User: Get the first one.
VUI: I am sorry, I didn't get that either. To read your first message say get me the first mail message.

In the above example, acoustically different commands are used to request the performance of the same action. In one or more embodiments, the system adapts to the user's preferred command set by monitoring consistent rejection patterns. In some embodiments, the system also determines if any rejection is due to the user's accent or tone of voice. To resolve this problem additional acoustic models are added to the grammar's vocabulary that match user utterances with heavy or unusual accents, for example.

Embodiments of the invention are described by way of example as applicable to systems and corresponding methods that provide an adaptive and natural voice interface system. In this exemplary embodiment, logic code for performing these methods is implemented in the form of, for example, application software 222. The logic code, in one embodiment, may be comprised of one or more modules that execute on one or more processors in a distributed or non-distributed communication model.

Hardware & Software Environments

In accordance with one or more embodiments, the system is composed of two environments, a software environment and a hardware environment. The hardware includes the machinery and equipment that provide an execution environment for the software. On the other hand, the software provides the execution instructions for the hardware.

The software can be divided into two major classes including system software and application software. System software includes control programs, such as the operating system (OS) and information management systems that instruct the hardware how to function and process information. Application software is a program that performs a specific task. As provided herein, in embodiments of the invention, system and application software are implemented and executed on one or more hardware environments.

Figure 4A:
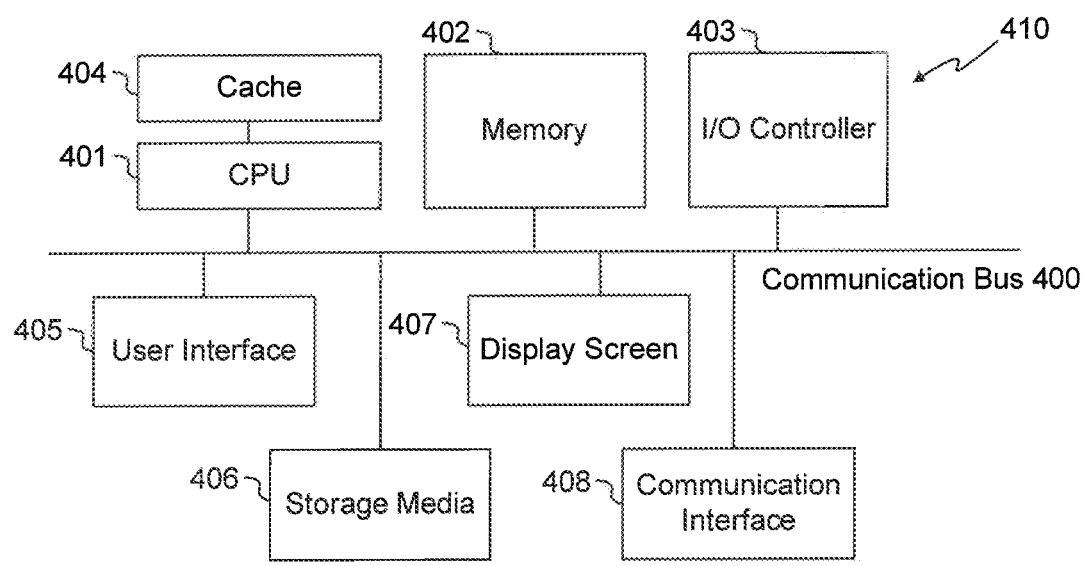
FIGS. 4A and 4B are block diagrams illustrating exemplary hardware and software components utilized in one or more system implementations, according to one or more embodiments.
Figure 4B:
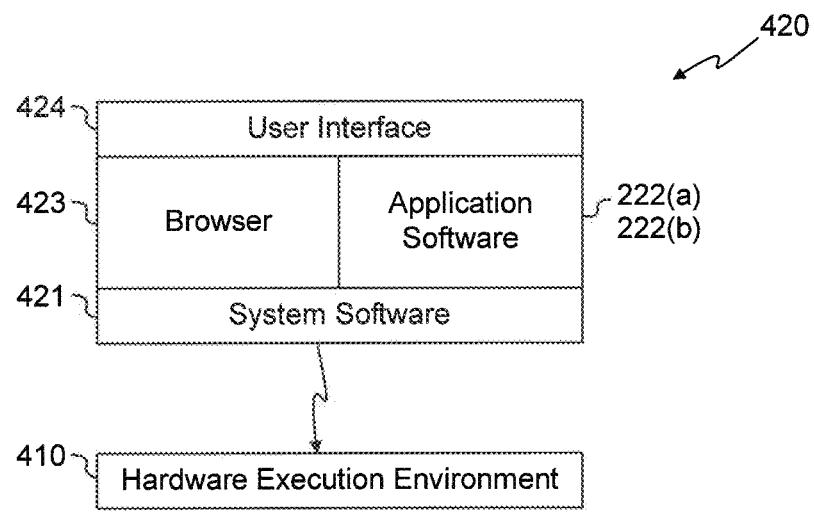

The invention may be practiced either individually or in combination with suitable hardware or software architectures or environments. For example, referring to FIG. 1A, communication device 110 and server system 130 may be implemented in association with computing system 410 (FIG. 4A). Application software 222 for providing an adaptive VUI may be implemented in association with one or multiple modules as a part of software system 420 (FIG. 4B). It may prove advantageous to construct a specialized apparatus to execute said modules by way of dedicated computer systems with hard-wired logic code stored in non-volatile memory, such as, by way of example, read-only memory (ROM).

Hardware Environment

An embodiment of the system can be implemented as application software 222 in the form of computer readable code executed on a general purpose computing system 410. Computing system 410 includes a central processor unit (CPU) 401, a main memory 402, an input/output controller 403, optional cache memory 404, user interface devices 405 (e.g., keyboard, pointing device), storage media 406 (e.g., hard drive), a display screen 407, and a communication interface 408 (e.g., an integrated services digital network (ISDN) card). A communication bus 400 is utilized to connect the above system components. Computing system 410 may be capable of communicating with other systems through communication interface 408.

In one or more embodiments, computing system 410 may not include all the above components, or may include additional components for additional functionality or utility.

For example, computing system 410 can be a laptop computer or other portable computing device that can send messages and receive data through communication interface 408. Computing system 410 may be partially or fully embodied in an embedded system such as a set-top box, a personal data assistant (PDA), a wireless communication unit (e.g., cellular phone), web televisions, or other similar hardware platforms that have information processing and/or data storage capabilities.

Communication interface 408 can send and receive electrical, electromagnetic, or optical signals that carry digital data streams representing various types of information including logic code. The logic code can be executed by central processor unit 401 or is stored in storage media 406 or other non-volatile storage for later execution. Logic code may be transmitted via a carrier wave or may be embodied in any other form of computer program product. In one or more embodiments of the invention, processor 401 is a microprocessor manufactured by Motorola, Intel, or Sun Microsystems Corporations. The named processors are for the purpose of example only. Any other suitable microprocessor, microcontroller, or microcomputer may be utilized.

Software Environment

FIG. 4B illustrates exemplary computer software 420 suited for managing and directing the operation of the hardware environment described above. Computer software 420 is, typically, stored in storage media 406 and is loaded into memory 402 prior to execution. Computer software 420 may comprise system software 421 and application software 222. System software 421 includes control software such as an operating system that controls the low-level operations of computing system 410. In one or more embodiments of the invention, the operating system can be Microsoft Windows 2000®, Microsoft Windows NT®, Macintosh OS®, UNIX, LINUX, or any other suitable operating system.

Application software 222 can include one or more computer programs that are executed on top of system software 421 after being loaded from storage media 406 into memory 402. In a client-server architecture, application software 222 may include a client software 222(a) and/or a server software 222(b). Referring to FIG. 1A for example, in one embodiment of the invention, client software 222(a) is executed on communication device 110 and server software 222(b) is executed on server system 130. Computer software 420 may also include web browser software 423 for browsing the Internet. Further, computer software 420 includes a user interface 424 for receiving user commands and data and delivering content or prompts to a user.

Exemplary Embodiment of Voice User Interface System

Embodiments of the invention are described by way of example as applicable to a system and corresponding methods that provide an adaptive voice user interface. Provided below are the descriptions of the content accessible in each domain and exemplary dialogues for traversing through some of these domains.

Mail

The mail domain allows a user to listen and delete voice messages stored on the system for the user. Once deleted, messages are sent to a trash bin, which cannot be accessed via the VUI. In accordance to one embodiment, users are presented first with the mail header. Thereafter, a user may cause the system to play the body of the message by saying, for example, "Play it," or other equivalent command or instruction. To delete the message the user may say, for example, "Get rid of it," or other equivalent command or instruction. An exemplary dialogue is provided below:

User: Get my mail.
VUI: You have three new messages and you have old messages. Here's the first one.
Message from: (TTS) Bill Byrne, Subject: (TTS) hello . . . Say "Play it" to hear the rest of the message . . .
User: Play it.
VUI: (TTS) Hi Bill.
User: Get rid of it.
VUI: Are you sure you want to delete this message?
User: Yes.
VUI: OK, it's gone.
User: Get the next one . . .

In one or more embodiments, after a message is read, it will be tagged as "old," but is not deleted until the user specifically instructs the system. Old messages are not accessible, in some embodiments, until the next time the user logs into the system. An exemplary list of commands and instructions available while visiting the Mail domain are provided below:

Get my new mail
Get my old mail
Get my mail
Get rid of it/Throw it away
Play it/Read it
Play it again/Read it again
Get the first one
Get the next one
Get the previous one
Get the last one Stock Quotes The Stock Quotes domain allows users to listen to information about a predefined list of stocks in accordance with the content of the user profile. In some embodiments, the user can also cause the system to look up any publicly traded company or index, for example. Exemplary dialogues within the Stock Quotes domain are provided below:

User: Get my stock quotes.
VUI: Moving to stock quotes. You have three companies listed. Here's the first one . . . General Magic . . .
User: Look up a quote for IBM.
VUI: IBM . . . Last sale price . . .
User: Look up the NASDAQ.
VUI: The NASDAQ is up 30 points at 3999.

In accordance with one embodiment, stock quotes are delivered as concatenated prompts. Concatenated prompts are sound bytes that are put next to each other and played, in order to form an audio output. In some embodiments, the user can cause the system to repeat the information for the stocks listed in the user profile by simply repeating "Get my stock quotes" or "Get my stock profile." An exemplary dialogue is provided below:

User: Look up a quote for IBM.
VUI: IBM . . . Last sale price . . .
User: Get my stock quotes.
VUI: I'll get your profile . . . You've listed . . .

An exemplary list of commands and instructions available while visiting the Stock Quotes domain are provide below:

Get my stock quotes
Look up a quote for <company name>
Play it again/Read it again
Get the first one
Get the next one
Get the previous one
Get the last one News The News domain allows users to listen to a predefined list of news categories as defined in the user profile. It also allows the user to look up news stories in a specific new category or a specific new story, for example. In some embodiments, the set of news categories available in the News domain is limited to ten to twenty choices. News stories in each category are in the form of prerecorded audio feeds and similar to a radio broadcast. Thus, the broadcasting voice can change from story to story.

Exemplary dialogues within the News domain are provided below:

User: Get my news.
VUI: Moving to News . . . You've listed three categories in your news profile Here's the first one . . . <Play audio feed>.
User: Get my news.
VUI: Here is your business news update for July 15th at 3:00 p.m. eastern . . .
User: Look up Sports News.
VUI: Here is your sports news update for July 15th at 3:00 p.m. eastern . . .
User: Look up World News.
VUI: This is the World News Update for . . .
User: Get my news.
VUI: I'll get your profile . . . You've listed . . .

An exemplary list of commands and instructions available while visiting the News domain are provide below:

Get my news
Play/Read it again
Get the first one
Get the next one
Get the previous one
Get the last one
Headline news
National News
World News
Business News
Sports News
Stock Market Update
Sports Scores The Sports Scores domain allows users to listen to scores for current sport events as indicated in the predefined list included in the user profile. The user can also look up the scores for sport events not listed in the user profile by providing specific commands to access that information. This information is provided in the form of audio feeds, in accordance to one aspect of the invention. Exemplary dialogues within the Sports Scores domain are provided below:

User: Get my Sports Scores.
VUI: Moving to sports scores . . . You've listed three categories in your sports profile. Here's the first one . . .
Here is your San Francisco Giants update . . .
User: Look up Pro Football.
VUI: Here is NFL update for July 15th at 3:00 pm eastern . . .
User: Look up College Basketball.
VUI: Here's your Men's NCAA Basketball update for . . .
User: Get my sports scores.
VUI: I'll get your profile . . . You've listed . . .

An exemplary list of commands and instructions available while visiting the Sports Scores domain are provide below:

Get my sports scores
Major League Baseball
Professional hockey
Professional basketball
Professional golf
Speedway racing
College sports update
College basketball
College football
Play it again
Get the first/next/previous/last one
Weather The Weather domain allows users to listen to weather reports for a list of cities included in the user profile, for example. Alternatively, a user may access weather information by providing the zip code of a city, or other identifying information. In some embodiments, the system can track the user's geographic coordinates, via a Global Positioning System (GPS) or based on cellular site locations, for example, and provide the user with the local weather forecast.

Weather reports are delivered in the form of concatenated prompts and can comprise weather watches, warnings and advisories, wind chill, wind speed, heat index, and humidity readings, for example. Other information in the report can comprise current temperature and conditions, as well as the day's forecast, and high and low temperatures. In some embodiments a five-day forecast is also provided. Exemplary dialogues within the weather domain are provided below:

User: Get my weather.
VUI: Moving to weather You've listed three geographic locations in your weather profile. Here's the first one (city name in TTS) Columbus, Ohio—There's a tornado warning in your area. Currently . . . it's 80 degrees and very windy with winds at 30 knots out of the southwest. Today's forecast calls for clear skies, with a high of 84 and low of 69 . . .
User: Look up my local weather.
VUI: <TTS City name> Your local weather station reports . . .

Exemplary commands available in the Weather domain are:

Get my weather
Look up the local weather
Play/Read it again
Get the first one
Get the next one
Get the previous one
Get the last one
Entertainment Referring to FIG. 1B, in one or more embodiments, the Entertainment domain comprises three sub-domains: Horoscopes, Television Guide, and Lottery. Each user can setup an Entertainment profile and choose categories within the above sub-domains that include audio feeds corresponding to each category of information. In embodiments of the invention, the sub-domains are implemented such that the user can access content of a single sub-domain without having to listen to the content of the other sub-domains, for example.

Exemplary dialogues in the Entertainment domain are provided below:

User: Get my entertainment profile.
VUI: Moving to entertainment . . . You have seven items listed in your entertainment profile. Here's the first one. The winning Big Game numbers are . . .
User: Get the next one.
VUI: Here's the next one. Aquarius, today you will . . .
User: [silent]
VUI: Here's the next one. Ally McBeal meets a man who . . .
User: [silent]

VUI: Here's the next one. Yesterday, on Day's of Our
  Lives . . .
User: [silent]
VUI: Here's the next one. On ABC tonight at 6:00 . . .
User: Get the last one.
VUI: Here's the last one. On FOX at 6:00 . . .
VUI: Let me know what you'd like me to do.
User: Get my TV guide.
VUI: You have four television items in your entertainment
  profile. Here's the—
User: Look up the Young and the Restless.
VUI: The Young and the Restless . . .
VUI: Let me know what you'd like me to do.
User: Get my news.
VUI: Moving to news. You have three items listed in your
  news profile . . .
User: Get my lottery results.
VUI: OK. Moving to lottery results. You have one item
  listed in your lottery profile. Here's the first one. The
  winning Big Game numbers are . . .
User: Goodbye.
VUI: Thanks for calling. Bye.
(Another Example)
User: Get my horoscopes.
VUI: You have two horoscopes listed in your entertain-
  ment profile.
Here's the first one . . .
User: Get my sports scores.
VUI: Moving to sports scores . . .
User: Get my entertainment.
VUI: Moving to entertainment. You have 6 categories
  listed in your entertainment profile.
User: Get my horoscopes.
VUI: Moving to horoscopes. Tell me the horoscope you'd
  like me to look up, otherwise, I'll just read your
  horoscopes again. For a list of signs, say "What are my
  choices?
User: Look up the horoscope for Virgo.
VUI: Today is your day, Virgo.
User: Get my horoscope profile.
VUI: You have two horoscopes listed in your entertain-
  ment profile.
Here's the first one . . .
User: Get my lottery results.
VUI: You have two lotteries listed in your entertainment
  profile. Here's the first one. Here is the result of
  the . . .

In accordance with one aspect of the system, the user while in the Entertainment domain can lookup the lottery results by state (e.g., "Lookup the Lottery for California."), television programs by category (e.g., "Lookup Soap Operas."), and horoscopes by astrological sign (e.g., "Lookup the Horoscope for Virgo."). Lottery, for example, can be also looked up by name (e.g., Pick 3, California Fantasy). Exemplary dialogues in the Lottery sub-domain are provided below:

User: Get my lottery results.
VUI: Moving to lottery results. You have six lotteries
  listed in your entertainment profile. Here's the . . .
User: Look up the California state lottery.
VUI: I have seven lottery results for that state. Here's the
  first one: California Daily 3, winning numbers are . . .
User: Get the next one.
VUI: Next one. California Daily Derby winning numbers
  for Tuesday . . .
User: (silent)
VUI: Here's the next one. Here are the California Fantasy
  results for . . .
User: Get the next one.
VUI: Next one. Here is the result of the California Super
  Lotto . . .
User: Get the last one.
VUI: Here's the last one. The results of the
  California . . .

The TV Guide sub-domain may include multiple categories, for example: Series Update, Soap Opera Diary, and Evening Line-Up. The titles of these categories may of course be selected differently, or additional categories may be included, depending on implementation. Series Update provides a synopsis of what happened on the major evening series, while Soap Opera Diary gives an overview of happenings from the daily soaps. The difference between these two categories is that soap operas change daily, while prime time television series typically air once a week and are often reruns. Evening Line-Up provides a list of shows and the show times for each network. Each category if selected returns a list of feeds that the user may then browse through to hear the desired feeds. Exemplary dialogs in the TV guide sub-domain are provided below:

User: Get my television guide.
VUI: Moving to television. You have six television items
  listed in your entertainment profile. Here's the . . .
User: Look up Soap Opera Diary.
VUI: I have ten Soap Operas. Here's the first one. On
  General Hospital, Jake . . .
User: Get the next one.
VUI: Here's the next one. Yesterday, on Day's of Our
  Lives . . .
User: (silent)
VUI: Here's the next one. The Bold and the
  Beautiful . . .
User: Get the last one.
VUI: Here's the last one. Guiding Light . . .
User: Look up Series Update.
VUI: I have nine items in Series Update. Here's the first
  one. On Ally McBeal . . .
User: Get the next one.
VUI: Here's the next one. The X-files . . .
User: Get the last one.
VUI: Here's the last one. NYPD Blue . . .
User: Look up Evening Line-up.
VUI: I have eight items in Evening Line-up. Here's the
  first one. On ABC tonight . . .
User: Get the last one.
VUI: Here's the last one. On ESPN tonight . . .

Listed below are exemplary commands and instruction users are to use in order to switch from one domain to the next:

Get my email
Get my stock quotes
Get my news
Get my weather
Get my sports scores
Get my entertainment
Get my horoscopes
Get my television guide
Get my lottery results Thus, methods and systems for providing a voice user interface are provided. The embodiments described above are to be considered in all aspects as illustrative only and not restrictive in any manner. Thus, other exemplary embodiments, system architectures, platforms, implementations, and applications that can support various aspects of the invention may be utilized without departing from the essential characteristics described herein. These and various other adaptations and combinations of features of the embodiments disclosed are within the scope of the invention. The invention is defined by the claims and their full scope of equivalents.

The invention claimed is:

1. A method comprising:
receiving a request for content corresponding to a content domain of a voice interface, the request comprising a voice command matching a domain vocabulary of the content domain that includes a term recognizable within the content domain, wherein the content domain represents an information group related to a common topic or subject and is located within a domain hierarchy of the voice interface including a plurality of content domains;
determining whether the request satisfies a request threshold of a minimum number of requests made to the content domain;
adding the term of the domain vocabulary to a global vocabulary for the voice interface based on satisfaction of the request threshold, wherein the term added to the global vocabulary is recognizable by the voice interface at any recognition instance within the domain hierarchy; and
repeating the determining and the adding for additional received requests for content.

2. The method of claim 1, further comprising:
receiving a personalization request comprising preference information used to configure the voice interface.

3. The method of claim 2, wherein adding the term is further based on the personalization request.

4. The method of claim 2, further comprising:
configuring one or more favorite domains of the voice interface based on the personalization request.

5. The method of claim 2, further comprising:
configuring a traversal path for one or more content domains and sub-domains within the domain hierarchy of the voice interface based on the personalization request, wherein the traversal path represents an ordering preference of the one or more domains and sub-domains of the voice interface.

6. The method of claim 1, further comprising:
storing the request in an interaction history portion of a profile specific to a user of the voice interface; and
adjusting a conversational style of the voice interface to provide more formal or more informal voice responses to the user based on the interaction history.

7. The method of claim 1, further comprising:
storing the global vocabulary in a profile specific to a user of the voice interface.

8. A non-transitory computer-readable medium having instructions stored thereon, execution of which, by a computing device, causes the computing device to perform operations comprising:
receiving a request for content corresponding to a content domain of a voice interface, the request comprising a voice command matching a domain vocabulary of the content domain that includes a term recognizable within the content domain, wherein the content domain represents an information group related to a common topic or subject and is located within a domain hierarchy of the voice interface including a plurality of content domains;
determining whether the request satisfies a request threshold of a minimum number of requests made to the content domain;
adding the term of the domain vocabulary to a global vocabulary for the voice interface based on satisfaction of the request threshold, wherein the term added to the global vocabulary is recognizable by the voice interface at any recognition instance within the domain hierarchy; and
repeating the determining and the adding for additional received requests for content.

9. The non-transitory computer-readable medium of claim 8, the operations further comprising:
receiving a personalization request comprising preference information used to configure the voice interface.

10. The non-transitory computer-readable medium of claim 9, wherein adding the term is further based on the personalization request.

11. The non-transitory computer-readable medium of claim 9, the operations further comprising:
configuring one or more favorite domains of the voice interface based on the personalization request.

12. The non-transitory computer-readable medium of claim 9, the operations further comprising:
configuring a traversal path for one or more content domains and sub-domains within the domain hierarchy of the voice interface based on the personalization request, wherein the traversal path represents an ordering preference of the one or more domains and sub-domains of the voice interface.

13. The non-transitory computer-readable medium of claim 8, the operations further comprising:
storing the request in an interaction history portion of a profile specific to a user of the voice interface; and
adjusting a conversational style of the voice interface to provide more formal or more informal voice responses to the user based on the interaction history.

14. The non-transitory computer-readable medium of claim 8, the operations further comprising:
storing the global vocabulary in a profile specific to a user of the voice interface.

15. A system comprising:
a memory storing:
a receiving module configured to receive a request for content corresponding to a content domain of a voice interface, the request comprising a voice command matching a domain vocabulary the content domain that includes a term recognizable within the content domain, wherein the content domain represents an information group related to a common topic or subject and is located within a domain hierarchy of the voice interface including a plurality of content domains,
a determining module configured to determine whether the request satisfies a request threshold of a minimum number of requests made to the content domain, and
an adding module configured to add the term of the domain vocabulary to a global vocabulary for the voice interface based on satisfaction of the request threshold, wherein the term added to the global vocabulary is recognizable by the voice interface at any recognition instance within the domain hierarchy, wherein the determining and the adding modules are further configured to repeat the determination and addition for additional received requests for content; and one or more processors configured to process the modules.

16. The system of claim 15, further comprising:
a personalization module configured to receive a personalization request comprising preference information used to configure the voice interface.

17. The system of claim 16, wherein adding the term is further based on the personalization request.

18. The system of claim 16, wherein the personalization module is further configured to configure one or more favorite domains of the voice interface based on the personalization request.

19. The system of claim 16, wherein the personalization module is further configured to configure a traversal path for one or more content domains and sub-domains within the domain hierarchy of the voice interface based on the personalization request, wherein the traversal path represents an ordering preference of the one or more domains and sub-domains of the voice interface.

20. The system of claim 15, further comprising:
a storing module configured to store the request in an interaction history portion of a profile specific to a user of the voice interface; and
an adjusting module configured to adjust a conversational style of the voice interface to provide more formal or more informal voice responses to the user based on the interaction history.

21. The system of claim 15, further comprising:
a storing module configured to store the global vocabulary in a profile specific to a user of the voice interface.

22. The method of claim 1, wherein the domain hierarchy further includes a plurality of primary content domains and content sub-domains, and wherein the content domain corresponding to the received request is one of a primary content domain or content sub-domain of the domain hierarchy.

23. The method of claim 6, wherein the adjusting further comprises:
providing extended or shortened voice menu prompts; and
increasing or reducing a speaker pace of the voice interface.

24. The method of claim 8, wherein the domain hierarchy further includes a plurality of primary content domains and content sub-domains, and wherein the content domain corresponding to the received request is one of a primary content domain or content sub-domain of the domain hierarchy.

25. The non-transitory computer-readable medium of claim 13, wherein the adjusting further comprises:
providing extended or shortened voice menu prompts; and
increasing or reducing a speaker pace of the voice interface.

26. The system of claim 15, wherein the domain hierarchy further includes a plurality of primary content domains and content sub-domains, and wherein the content domain corresponding to the received request is one of a primary content domain or content sub-domain of the domain hierarchy.

27. The system of claim 20, wherein to adjust the conversational style the adjusting module is further configured to:
provide extended or shortened menu prompts; and
increase or reduce a speaker pace of the voice interface.

28. The method of claim 1, wherein the request is received at a recognition instance corresponding to a second content domain of the voice interface, and wherein the method further comprises:
processing the voice command against teens included in a second domain vocabulary corresponding to the second content domain; and
performing the determining and the adding when the voice command matches a term of the second domain vocabulary.

29. The non-transitory computer-readable medium of claim 8, wherein the request is received at a recognition instance corresponding to a second content domain of the voice interface, and wherein the operations further comprise:
processing the voice command against terms included in a second domain vocabulary corresponding to the second content domain; and
performing the determining and the adding when the voice command matches a term of the second domain vocabulary.

30. The system of claim 15, wherein the request is received at a recognition instance corresponding to a second content domain of the voice interface, and wherein the receiving module is further configured to:
process the voice command against terms included in a second domain vocabulary corresponding to the second content domain;
wherein the determining and the adding are performed when the voice command matches a term of the second domain vocabulary.

* * * * *